United States Patent
Nelson et al.

(10) Patent No.: US 8,267,531 B2
(45) Date of Patent: Sep. 18, 2012

(54) CORRECTING ROW AND COLUMN SHIFTS IN A CALIBRATION MATRIX FOR A PROJECTION SYSTEM

(75) Inventors: Steve Nelson, San Jose, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 12/748,202

(22) Filed: Mar. 26, 2010

(65) Prior Publication Data

US 2011/0234922 A1 Sep. 29, 2011

(51) Int. Cl.
- G03B 21/26 (2006.01)
- G03B 21/14 (2006.01)
- H04N 5/66 (2006.01)
- H04N 3/22 (2006.01)
- G09G 5/00 (2006.01)

(52) U.S. Cl. .............. 353/121; 353/94; 353/69; 353/30; 348/383; 348/745; 348/190; 345/3.3

(58) Field of Classification Search .................... 353/30, 353/94, 69, 121; 348/383, 745, 190; 345/3.3
See application file for complete search history.

(56) References Cited

U.S. PATENT DOCUMENTS

| | | | |
|---|---|---|---|
| 6,456,339 B1 | 9/2002 | Surati et al. | |
| 6,727,864 B1 | 4/2004 | Johnson et al. | |
| 7,038,727 B2 | 5/2006 | Majumder et al. | |
| 7,129,456 B2 | 10/2006 | Ioka et al. | |
| 2001/0013904 A1* | 8/2001 | Kubota et al. | 348/383 |
| 2001/0019358 A1* | 9/2001 | Waki et al. | 348/189 |
| 2002/0012004 A1 | 1/2002 | Deering | |
| 2002/0041708 A1 | 4/2002 | Pettitt | |
| 2003/0103162 A1* | 6/2003 | Sano et al. | 348/383 |
| 2006/0007406 A1 | 1/2006 | Adkins et al. | |
| 2006/0280360 A1 | 12/2006 | Holub | |
| 2007/0091277 A1 | 4/2007 | Damera-Venkata et al. | |
| 2007/0171380 A1 | 7/2007 | Wright et al. | |
| 2007/0291184 A1 | 12/2007 | Harville et al. | |
| 2008/0143978 A1 | 6/2008 | Damera-Venkata et al. | |
| 2008/0259223 A1 | 10/2008 | Read et al. | |
| 2009/0027523 A1 | 1/2009 | Chang et al. | |
| 2011/0228104 A1* | 9/2011 | Nelson | 348/190 |

FOREIGN PATENT DOCUMENTS

| | | |
|---|---|---|
| JP | 2006-108988 | 4/2006 |
| JP | 2006-135381 | 5/2006 |

\* cited by examiner

*Primary Examiner* — Georgia Y Epps
*Assistant Examiner* — Magda Cruz (57) ABSTRACT

A method for correcting a projection from a plurality of digital projectors is provided. The method includes receiving as an input a matrix which maps each pixel to be projected to a captured pixel that includes a row value and a column value and detecting a shift with respect row or column values in the matrix. The method further includes determining attributes of the shift, wherein the attributes include a type for the shift and an overlap length for the shift. A gradient length is determined from the overlap length. A gradient of pixel weightings is generated for each gradient length. The pixel weightings are uniformly sloping and are associated with pixels in the gradient length and neighboring pixels. Intersecting gradients re merged and a list that includes common points and diagonal points is created from the merging process. The method operations may be embodied as code on a computer readable storage medium.

17 Claims, 7 Drawing Sheets

```
                            2 2 2 2 2 2 2
Processing row->  1 1 1 1 1 1 2 2 2 2 2
                              1 1 1 1 1 1 1
```

FIGURE 4A

```
                  3 3 3 3 3 3 3
                  3 3 3 3 3 2 2 2 2 2 2 2 2 2
Processing row->  2 2 2 2 2 2 1 1 1 1 1 1 1 1 1
                  1 1 1 1 1 1 1 1 0 0 0 0 0 0 0
                  0 0 0 0 0 0 0 0 0 0
```

FIGURE 4B

```
V-Processing column
1 2
1 2
1 2 2
1 2 2
1 1 2
1 1 2
1 2
1 2
```

FIGURE 5A

```
V_ Processing column
1 2
1 2
1 1 2
1 1 2
1 2 2
1 2 2
1 2
1 2
```

CORRECTING ROW AND COLUMN SHIFTS IN A CALIBRATION MATRIX FOR A PROJECTION SYSTEM

BACKGROUND

LCD and DLP projectors have become an essential tool of most businesses for presenting information usually to small and medium sized groups. Recently due to cost reductions and increases in computing power there has been increased interest in using multiple projectors to create a large unified display. There have been many attempts to accomplish this goal but most approaches require too much effort or too much equipment to configure, align, and operate the projectors as a unified display. In addition, the quality level of the display is inadequate as viewers could identify the areas of each projector in the large unified display due to display artifacts. When trying to create a display from a system of multiple projectors, a desirable attribute is seamlessness. That is to say, the display from one projector in the system should not be easily discernable by the human eye when combined with the displays from the other projectors in the system. One display artifact prevalent in the large unified display from a plurality of projectors is that straight lines from a source image may appear as jagged lines when translated to the large unified display.

It is within this context that the embodiments arise.

SUMMARY

In an example embodiment, a method for correcting a projection from a plurality of digital projectors is provided. The method includes receiving as an input, a matrix which maps each pixel to be projected to a captured pixel that includes a row value and a column value. The method includes detecting a shift with respect to row or column values in the matrix. The method further includes determining attributes of the shift, wherein the attributes include a type for the shift and an overlap length for the shift. A gradient length is determined from the overlap length and a gradient of pixel weightings is generated for each gradient length. The pixel weightings are uniformly sloping and are associated with pixels in the gradient length and neighboring pixels. Intersecting gradients are merged and a list that includes common points and diagonal points is created from the merging process. The method operations may be embodied as code on a computer readable storage medium in another embodiment.

These and other aspects and advantages of the claimed inventions will become apparent from the following detailed description, which taken in conjunction with the accompanying drawings, illustrates by way of example the principles of the inventions.

DETAILED DESCRIPTION

In the following description, numerous specific details are set forth in order to provide a thorough understanding of the exemplary embodiments. However, it will be apparent to one skilled in the art that the example embodiments might be practiced without some of these specific details. In other instances, process operations and implementation details have not been described in detail, if already well known.

The embodiments described herein may be employed with a high quality multiple projector system using low cost computer hardware and cameras to create a large unified display that can be easily configured. The approach described below has the flexibility to correct for distortions in the display surface or placement of the projectors through View Projection Matrix (VPM) technology. The VPM maps projector coordinates to camera coordinates. Once the projector coordinate to camera coordinate mapping is calculated the system blends the overlapping areas of the projectors to create a consistent brightness across the entire display. In one embodiment, the large scale system (employing up to eight projectors) is controlled by a computer running the LINUX™ operating system. In another embodiment, a system that supports two projectors connected to a computer running MICROSOFT WINDOWS™ may execute the embodiments described herein. Accordingly, the system displays MICROSOFT WINDOWS™ applications on the seamless two projector display. In the system the primary content may be a desktop view which consists of many small fonts and lines. These items introduce shifts in the row and columns of the View Projection Matrix (VPM) that introduce artifacts such as jagged lines and distorted fonts, which are corrected through the embodiments described below. Further details of the VPM may be found in application Ser. No. 11/963,638, filed Dec. 21, 2007, which is incorporated by reference herein.

A purpose of the calibration process for the multi-projector system is to create a mapping between the camera pixels and the projector pixels. In the ideal setup the camera focal plane is centered and parallel to the wall. The projectors are also setup with liquid crystal display (LCD) panels parallel to the wall. Such a setup, if even possible, would create a camera to projector mapping where each row and column in the camera are mapped to a single row or column in the projector. A straight line drawn across the image in the camera space would output a straight line across the projector's LCD. Unfortunately, such a set up is impossible to achieve in reality as many factors come into play, such as the placement of the camera and projectors, lens distortion in the camera, key stoning of the projector image, etc. Consequently, the camera to projector mapping is not "square" as in the ideal case. Thus, a straight line drawn in the camera space will usually traverse a few projector rows as the calibration process has tried to create a normalized view from the camera's perspective. When the primary content is video and images, the mapping of the camera to projector pixels is not a problem even with row or column shifts. With the display of desktop view or other interface, the shifts in the VPM cause noticeable artifacts.

To address these problems the embodiments first processes the calibration images to determine the camera to projector pixel mapping. In one exemplary embodiment, there is a one to one mapping between the camera and projector pixels. It should be appreciated that in one embodiment homography is used to create a matrix that maps a single projector point to a single camera point. In another embodiment, a gray code calibration method that maps more than one camera pixel to each projector pixel. One skilled in the art will appreciate that the methods described below could be extended to the gray code case where multiple camera pixels are mapped to a single projector pixel by treating the multiple camera pixels as a single group when applying the described methods for processing row and column shifts.

After the mapping between camera and projector pixels is calculated a VPM is created to store the information for the playback system. The VPM has an entry for each projector pixel and a list of camera pixels that map to that projector pixel. Other information such as the intensity level for blending and black point levels are associated with each camera pixel. Once the VPM has been created a post processing step is performed to analyze the row and column shifts within the VPM and modify the values in the VPM to make the shifts less noticeable.

Figure 1:
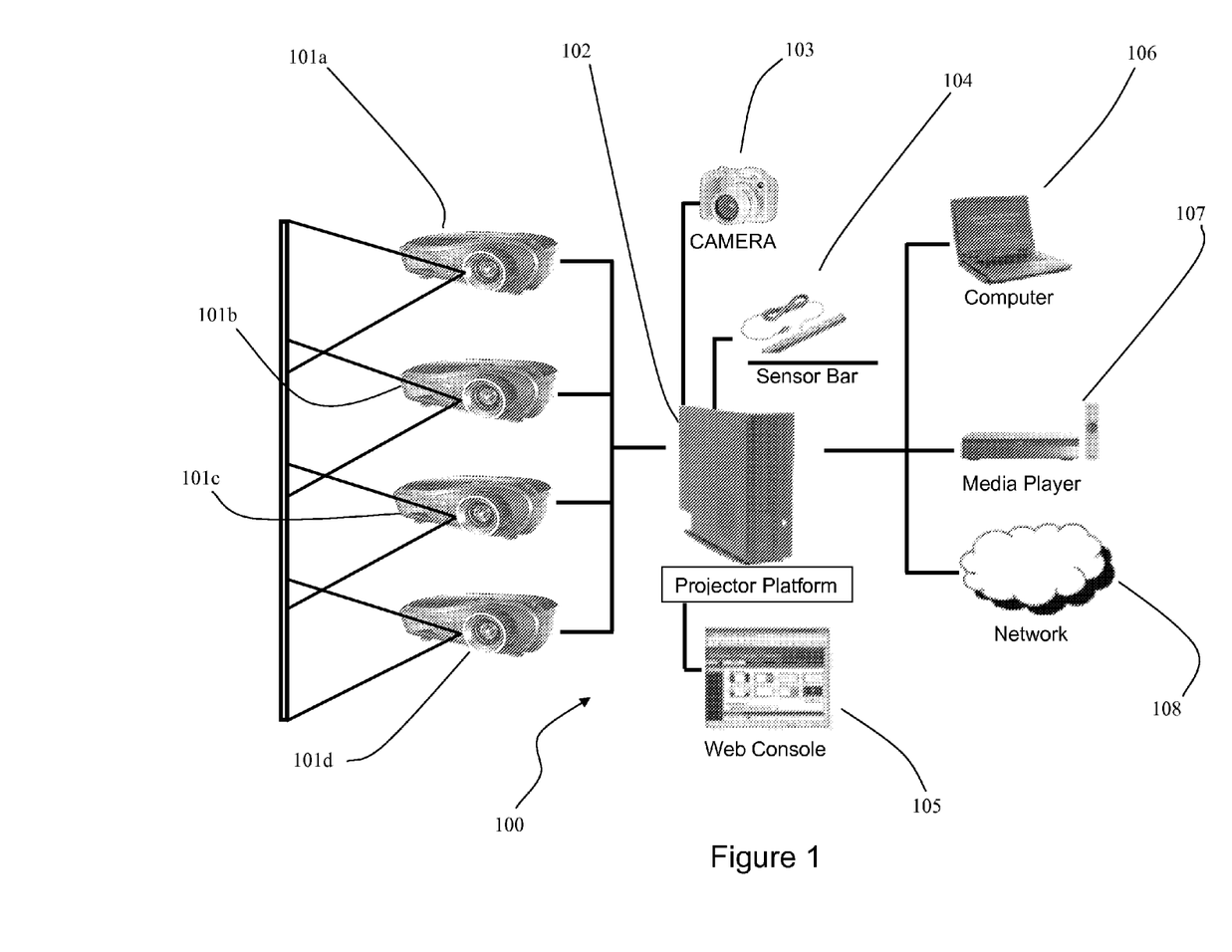
FIG. 1 is a schematic diagram of the hardware components for a system for creating a relatively seamless display from multiple projectors, in accordance with an example embodiment.

FIG. 1 is a schematic diagram of the hardware components for a system for creating a relatively seamless display from multiple projectors, in accordance with an example embodiment. In this embodiment, the system 100 includes a projector platform 102, which might be a general-purpose computer configured with a central processing unit (CPU) and a number of graphic processing units (GPUs), as well as memory, storage, and an operating system, such as a version of LINUX® or WINDOWS®. For example, the CPU might be an INTEL® Quad-Core Q6600 microprocessor and the GPUs might be two graphics cards which conform to the Peripheral Component Interconnect Express (PCIe) standard, such as the NVIDIA® GeForce 9800 GTX graphics cards. The two graphics cards allow the projector platform 102 to send video output for projection onto a surface to four video projectors, 101a, 101b, 101c, and 101d.

It will be appreciated that the example embodiments described herein might accommodate projection onto a flat surface or a surface that is irregular in terms of evenness. In an example embodiment, a digital still camera 103 (or a digital camera that is capable of taking a still photograph) is attached to projector platform 102 using USB (universal serial bus) cabling during calibration of the system 100. In an alternative example embodiment, a digital video camera might be used for calibration of the system 100. Following calibration, the digital camera 103 might be removed. An optional capture card allows for video input to the projector platform 102 from a laptop 106, from a media player 107, and/or from a network 108, which might be a LAN (local area network), a WAN (wide area network), the Internet, etc. An optional sensor bar 104 allows for non-video input to the project platform 102, as does the web console 105, which might receive input from a keyboard and/or a mouse.

Figure 2:
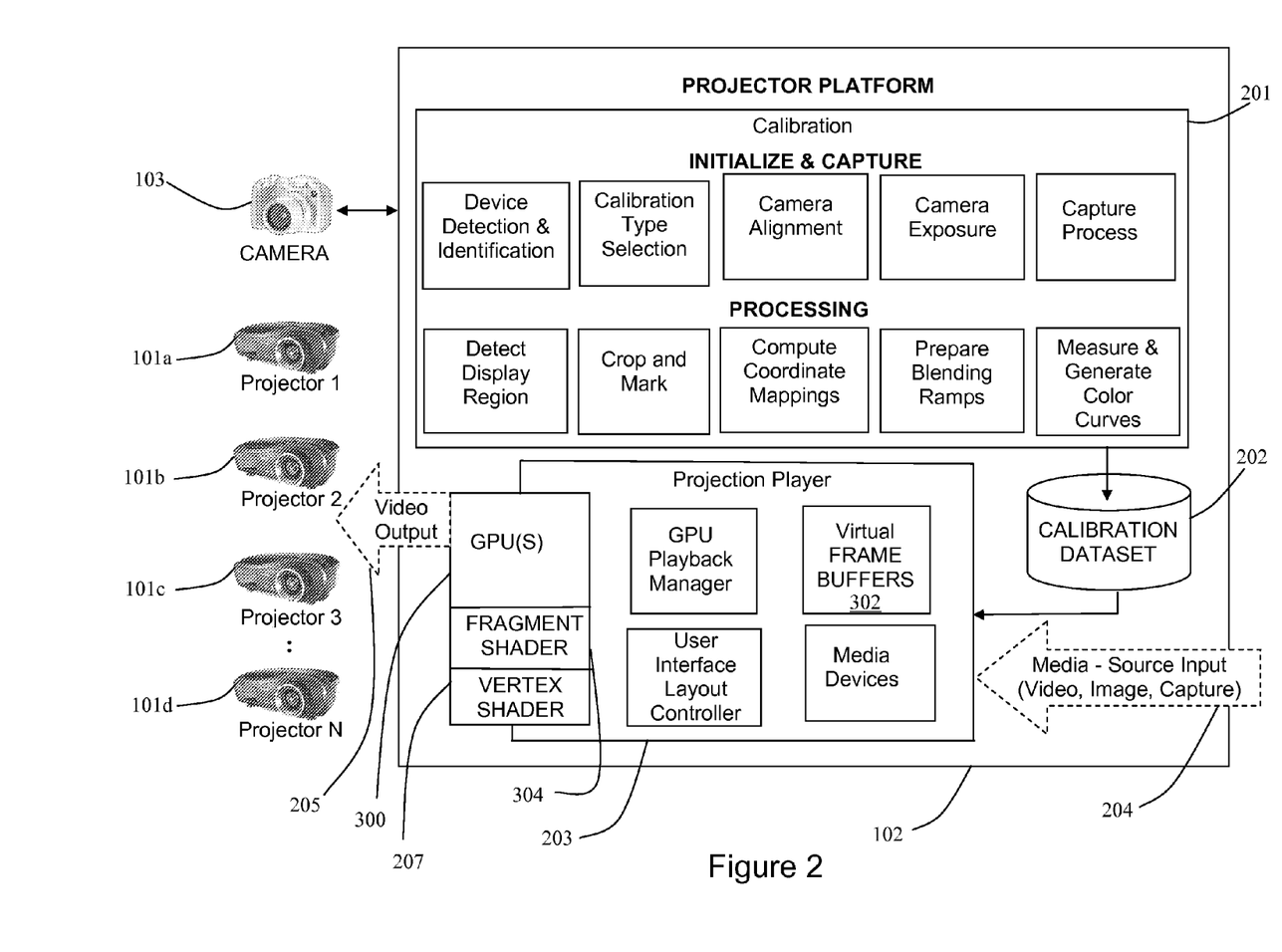
FIG. 2 is a schematic diagram of the high-level functional modules in a system for creating a relatively seamless display from multiple projectors, in accordance with an example embodiment.

FIG. 2 is a schematic diagram of the high-level functional modules in a system for creating a relatively seamless display from multiple projectors, in accordance with an example embodiment. In this embodiment, the projector platform 102 receives inputs 204 which are processed and subsequently output as video 205 to video projectors 101a, 101b, 101c, and 101d. As depicted in this figure, the inputs 204 might be video, images, or captures (e.g., captured with frame-grabber hardware or over a network). The digital camera 103 also provides input in the form of captured calibration images to the projector platform 102.

As depicted in FIG. 2, the projector platform 102 executes two high-level modules, which might be software, firmware, and/or hardware in example embodiments: a calibration module 201 and a projection player 203. The calibration module 201 interfaces with the projection player 203 through the calibration dataset 202, which persistently stores the output of the calibration module 201 for subsequent use by the projection player 203. The calibration module 201 includes two groups of modules. The first group of modules generally pertains to initialization and capture and includes modules for: (1) device detection and identification; (2) calibration type selection; (3) camera alignment; (4) camera exposure; and (5) capture process. The second group of modules generally pertains to processing and includes modules to: (1) detect display regions; (2) crop and mask; (3) compute coordinate mappings; (4) prepare blending ramps; and (5) measure and generate luminance (or color) adjustment curves. The embodiments described herein provide further details of the coordinate mappings module or blending ramps module. All results output by calibration module 201, including the luminance (or color) adjustment curves, and the adjustments to the VPM to correct the display artifacts described herein, are stored in the calibration dataset 202.

The projection player 203 takes as inputs the data stored in the calibration dataset 202 and the media 204. As depicted in FIG. 2, the projection player 203 includes the following modules: (1) a GPU playback manager; (2) virtual frame buffers; (3) a user-interface layout controller; and (4) media drawers. The projection player 203 interfaces with the system's GPUs, which execute a fragment shader and a vertex shader, in order to generate the adjusted video output 205 transmitted to the projectors 101a-101d for display on a surface. The fragment shader is the module in which the luminance (or color) adjustment curves are applied to pixels in source images, in an example embodiment described below.

It will be appreciated that at this point in the system, the media drawers have derived the source image from input 204, generated content, and virtual frame buffers, according to geometric conversions determined by the projection environment. Further geometric operations might be performed by the vertex shader (e.g., mappings) or by initial processes in the fragment shader. Consequently, the source image already incorporates the geometry of the image to be projected when the source image reaches the later processes of the fragment shader 207, where the luminance adjustment curves are applied.

Calibration module 201 represents a process that examines the output of one or more individual projectors 101a-101d and their relationship to one another. This information is processed to compute necessary adjustments for output pixels to best create a seamless unified display. The calibration process determines a maximum display region among the set of projectors. Virtual pixels make up the coordinate system of the unified display. Calibration module 201 accounts for mapping alignment and color blending measurements which can be associated with each device pixel. Individual device pixels in each projector's output projection are a potential contribution source to each virtual pixel of the unified display. Thus, the output of each video projector 101a-101d is examined carefully so that every device pixel can be identified and properly controlled to build the pixels of the unified display.

The physical size of the resulting unified display is determined by the count of projectors and the surface area occupied by the union of all projections in one embodiment. Projector pixel resolution determines the potential for unified display resolution. However, the resolution of the calibration captured camera frames determines the precision of pixel examination. Therefore, a camera frame defines the base virtual pixel coordinate system of a maximum unified display area. This camera coordinate system is used throughout the calibration process. The calibration process attempts to compute the mappings between projector device pixels and camera frame pixels. It should be appreciated that camera frame pixels can be scaled to a device pixel, if necessary however, precision error is propagated accordingly. Described below are further adjustments to the mappings between the projector device pixels and camera frame pixels to eliminate display artifacts associated with the display of graphical user interfaces.

The result of the calibration process is calibration dataset 202. Calibration dataset 202 contains all information that will be used by player module 102 to enable real-time pixel-level control over the data output by each video projector 101a-101d. The resulting pixel-adjusted output 205 produces a unified display surface across the set of all video projectors 101a-101d and corrections are made in many areas including individual projector registration, color matching, blending, black point, correlation, display surface geometry, jagged lines, distorted fonts, etc. Projection playback employs a calibration dataset prepared by the projector platform's calibration module 201, access to high-performance GPUs 300, and media content for display.

For each projector display, projection player 203 creates a virtual screen frame buffer 302 at the size computed for the bounded uniform display screen. Additionally, view projection matrix and color blending elements are loaded as appropriate from the calibration dataset contents associated with each given projector. Portions of calibration data 202 are converted and stored into texture elements provided to GPUs 300 for input to custom fragment-shader 304 and vertex-shader 207 modules (also loaded and compiled by the projection player). In one embodiment, OpenGL and the OpenGL Shading Language (GLSL) are used to define the fragment modules used by the player. Further details on the functionality of the projector platform and the calibration procedures may be found in U.S. Serial application Ser. Nos. 12/557,180 and 12/557,197, both of which are incorporated by reference herein.

Figure 3:
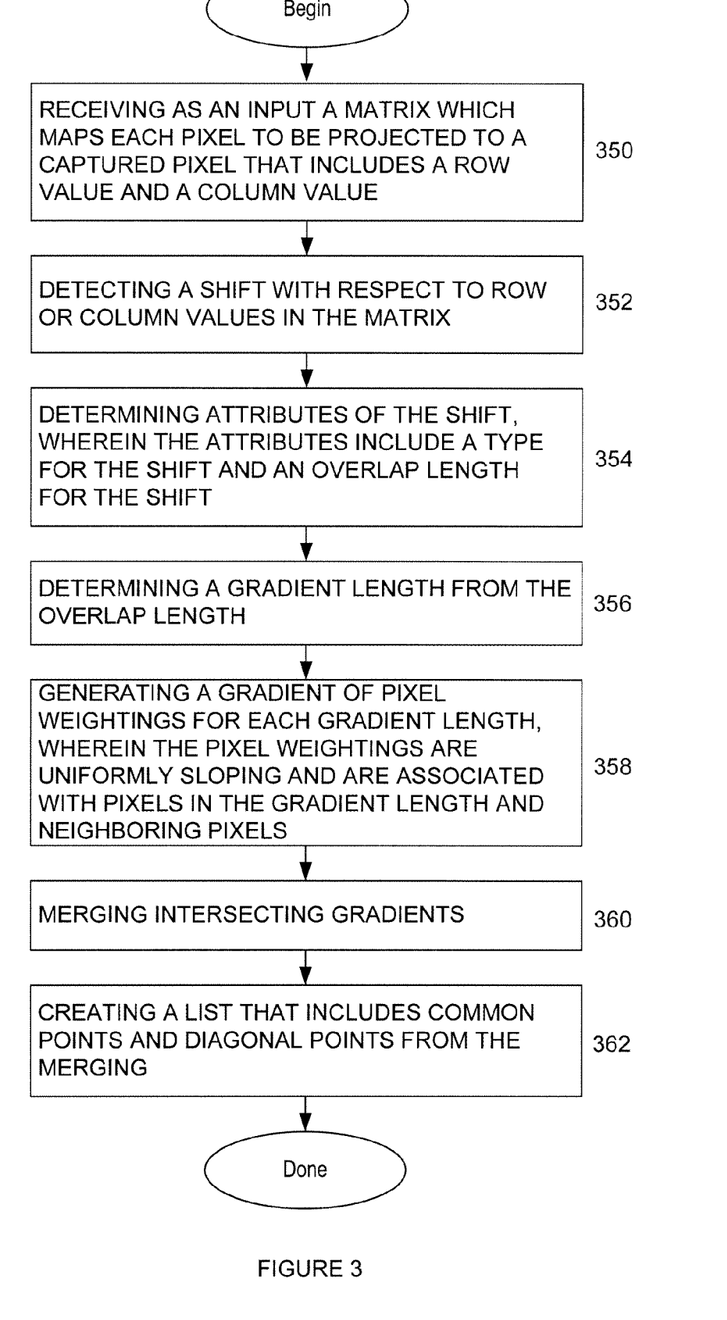
FIG. 3 is a flowchart diagram of the method operations for correcting a projection from a plurality of digital projectors in accordance with one embodiment of the invention.

FIG. 3 is a flowchart diagram of the method operations for correcting a projection from a plurality of digital projectors in accordance with one embodiment of the invention. The method initiates with operation 350 where a matrix which maps each pixel to be projected to a captured pixel that includes a row value and a column value is received as input. The processing may be performed through a processor accessing the code stored within the calibration module of FIG. 2 and the matrix may be the VPM mentioned above in one embodiment. The method then advances to operation 352 where a shift is detected with respect to row or column values in the matrix. The shift is detected by analyzing the VPM as described in more detail with regard to FIGS. 4A, 4B, 5A, and 5B in one embodiment. The method then proceeds to operation 354, where attributes of the shift are determined. The attributes may include a type for the shift and an overlap length for the shift. A gradient length is determined from the overlap length in operation 356. A gradient of pixel weightings for each gradient length is generated in operation 358. The pixel weightings are uniformly sloping and are associated with pixels in the gradient length and neighboring pixels in one embodiment. In operation 360 intersecting gradients are merged. The method then moves to operation 362 where a list that includes common points and diagonal points from the merging operation is created.

Figure 4A:
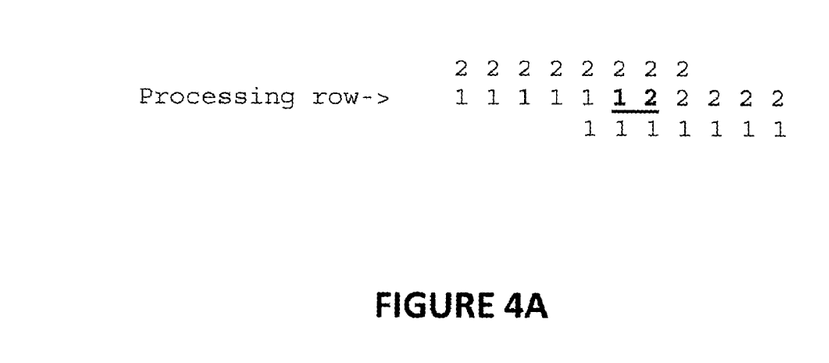
FIGS. 4A and 4B are schematic diagrams illustrating detectable row shift patterns existing in a view projection matrix (VPM) in accordance with one embodiment of the invention.
Figure 4B:
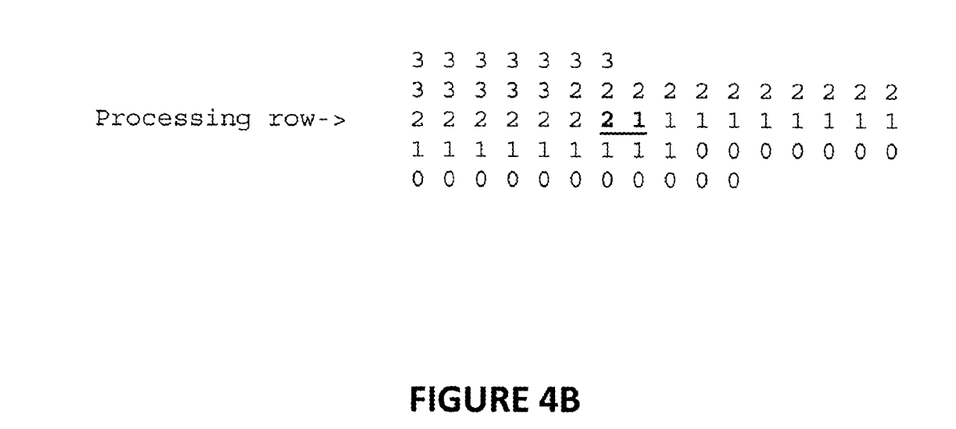
Figure 5A:
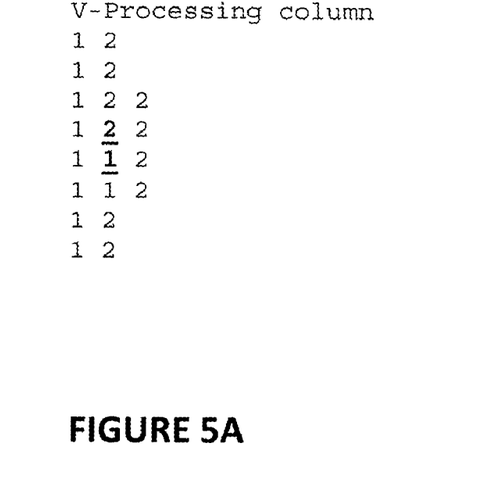
FIGS. 5A and 5B are schematic diagrams illustrating detectable column shift patterns detected existing in a view projection matrix in accordance with one embodiment of the invention.
Figure 5B:
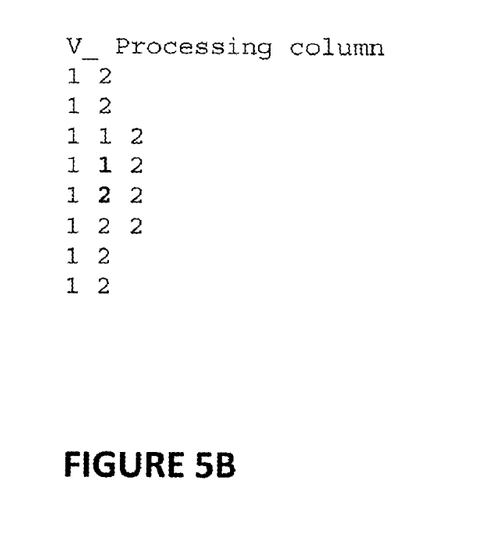

FIGS. 4A and 4B are schematic diagrams illustrating detectable row shift patterns existing in a view projection matrix in accordance with one embodiment of the invention. In one embodiment, each projector point in the VPM is examined for row shifts. The technique traverses each row across the VPM looking at the coordinates of the camera pixel mapped to the projector pixel. If the camera coordinate row value is not equal to the previous projector pixel's camera coordinate row value, a row shift has been found. Next the system determines the type of row shift as either an up or down row shift. FIG. 4A illustrates a down row shift, while FIG. 4B illustrates an up row shift. FIGS. 5A and 5B are schematic diagrams illustrating detectable column shift patterns detected existing in a view projection matrix in accordance with one embodiment of the invention. FIG. 5A illustrate a right column shift, while FIG. 5B illustrates a left column shift. In FIGS. 4A, 4B, 5A, and 5B the bold underlined numbers indicate the row or column shift is detected, as the camera coordinate row/column value is not equal to the previous projector pixel's camera coordinate row/column value.

For both row and column shifts, a ShiftInfo object is created and placed in either the row or column shift list. In one embodiment, the ShiftInfo class is defined as:

```
public static class ShiftInfo {
public enum ShiftDirection { DOWN, UP, LEFT, RIGHT, NONE };
public enum ShiftType { ROW_SHIFT, COLUMN_SHIFT };
private final VPMPoint projectorPoint;
private final ShiftType shiftType;
private final ShiftDirection shiftDirection;
private final int previousShiftValue;
private final int currentShiftValue;
/** number of pixels that overlap for the shift to the next
row/column */
private int overlapCount;
};
```

The ShiftInfo object contains the coordinates of the projector point where the shift occurred, the shift type, the shift direction and the previous and current values of the camera coordinate that shifted. In addition, a list of integers is created for row and column shift tracking. In the row list, one integer entry is created for each row. The offset into the row ShiftInfo list of first shift (if any) found in the row is stored in the corresponding offset in the integer list. A similar approach is used for tracking the first ShiftInfo object (if any) found for the first shift in a column.

After the row and column shifts have been identified, the length of the overlap between the row or column shifts is calculated. It should be appreciated that a similar process is followed for calculating column shift overlap lengths. The following describes how the row shift overlap lengths are calculated. For each ShiftInfo object in the list of row shifts detected, the method getRowShiftOverlapLength( ) is called. The method is shown below:

```
private int getRowShiftOverlapLength(final ShiftInfo currentShiftInfo,final List<ShiftInfo>
shiftedProjectorRowPoints,final List<Integer> shiftedRowOffsets) {
assert(currentShiftInfo.getShiftType( ) == ShiftType.ROW_SHIFT);
// final int shiftRowOffsetsSize = shiftedRowOffsets.size( );
ShiftInfo continuingShiftInfo = null;
int continuingShiftInfoColumn = −1;// 1-based
int overlapLength = −1;
final ShiftInfo.ShiftDirection shiftDirection = currentShiftInfo.getShiftDirection( );
final int currentRow = currentShiftInfo.getProjectorPoint( ).getRow( );
final int continuingRow = (shiftDirection == ShiftDirection.UP) ? currentRow − 1 : currentRow + 1; // 1-based
final int startIndex = shiftedRowOffsets.get(continuingRow−1);
if(startIndex < 0) {
// The continuing row has no row shifts. We assume that the row has a single camera row value mapped to
// every projector element for the row.
logger.debug("getRowShiftOverlapLength could not find start index for continuing row=" + continuingRow + "
current projectorPoint=" + currentShiftInfo.getProjectorPoint( ).toString( ) + " displayNum=" +
jobOptions.getDisplayNum( ));
overlapLength = projector Width − currentShiftInfo.getProjectorPoint( ).getColumn( ) + 1;
}
else {
final int endIndex = getNextValidIndex(continuingRow,shiftedRowOffsets);
final int continuingRowCurrentShiftValue = currentShiftInfo.getPreviousShiftValue( );
ArrayList<ShiftInfo> continuingShiftMatches = null;
ShiftInfo firstContinuingShiftInfo=null;
for (int i=startIndex; i < endIndex; i++) {
final ShiftInfo shiftInfo = shiftedProjectorRowPoints.get(i);
if (shiftInfo.getCurrentShiftValue( ) == continuingRowCurrentShiftValue) {
if (firstContinuingShiftInfo == null) {
firstContinuingShiftInfo = shiftInfo;
}
else {
if (continuingShiftMatches == null) {
continuingShiftMatches = new ArrayList<ShiftInfo>( );
continuingShiftMatches.add(firstContinuingShiftInfo);
}
continuingShiftMatches.add(shiftInfo);
}
}
}
if ((shiftDirection == ShiftDirection.UP) || (shiftDirection == ShiftDirection.DOWN)) {
if ((continuingShiftMatches == null) && (firstContinuingShiftInfo == null)) {
// logger.debug("getRowShiftOverlapLength could not find continuing shift info currentShiftInfo=" +
currentShiftInfo + " displayNum=" + jobOptions.getDisplayNum( ));
if (shiftDirection == ShiftDirection.UP) {
// We may have case where the overlap is from the beginning of the previous line
final ShiftInfo firstShiftInfo = shiftedProjectorRowPoints.get(startIndex);
if (firstShiftInfo != null) {
if (firstShiftInfo.getPreviousShiftValue( ) == currentShiftInfo.getPreviousShiftValue( )) {
continuingShiftInfoColumn = 1;
}
}
}
}
else if ((continuingShiftMatches == null) && (firstContinuingShiftInfo != null)) {
continuingShiftInfo = firstContinuingShiftInfo;
continuingShiftInfoColumn = continuingShiftInfo.getProjectorPoint( ).getColumn( );
}
else if (continuingShiftMatches != null) {
int minColumnDistance = Integer.MAX_VALUE;
ShiftInfo minColumnDistanceShiftInfo = null;
for (ShiftInfo shiftInfo: continuingShiftMatches) {
final int columnDistance = Math.abs(shiftInfo.getProjectorPoint( ).getColumn( ) −
currentShiftInfo.getProjectorPoint( ).getColumn( ));
if (columnDistance < minColumnDistance) {
minColumnDistance = columnDistance;
minColumnDistanceShiftInfo = shiftInfo;
}
}
assert(minColumnDistanceShiftInfo != null);
continuingShiftInfo = minColumnDistanceShiftInfo;
continuingShiftInfoColumn = continuingShiftInfo.getProjectorPoint( ).getColumn( );
}
else {
final String message = "getRowShiftOverlapLength up row invalid matches condition
currentShiftInfo=" + currentShiftInfo + " firstContinuingShiftInfo=" +
firstContinuingShiftInfo + " displayNum=" + jobOptions.getDisplayNum( );
logger.error(message);
throw new IllegalStateException(message);
}
if (continuingShiftInfoColumn > 0) {
```

```
-continued
overlapLength = Math.abs(continuingShiftInfoColumn –
currentShiftInfo.getProjectorPoint( ).getColumn( ));
}
}
else {
final String message = "getRowShiftOverlapLength invalid shift direction=" +
currentShiftInfo.getShiftDirection( ) + " displayNum=" + jobOptions.getDisplayNum( );
logger.error(message);
throw new IllegalStateException(message);
}
}
return overlapLength;
}
```

The method first searches the list of ShiftInfo objects in the list from offsets determined by the shift direction. The search looks for a continuation of the camera row value from where the line shifted. If more than one ShiftInfo object is found a list is created to track the matching ShiftInfo objects. Next, depending on the matching ShiftInfo objects found, the system then identifies the column of the continuing ShiftInfo object and calculates the overlap length. This value is returned to the calling method which updates the ShiftInfo object with the overlap length. Each ShiftInfo object is again processed to set the pixel weightings in the VPM. The processing of the row shifts is described below, however, one skilled in the art will appreciate that column shifts May be processed in a similar manner. To process the row shifts the method setRowShiftPixelWeights( ) is called. The method first calculates the length of the gradient by analyzing the length of the overlap, a minimum constant, and a maximum constant. Once the length of the gradient is determined the start and end offsets of the columns for the gradient are calculated. If the row shift direction is up, the following code from the method processes the row shift. A similar process is followed for down row shifts. The code to accomplish this functionality is provided below.

```
// create descending gradient from left to right for current row
if (currentRow < projectorHeight) {
double gradientAmount = 100.0 – gradientStep;
for (int i=gradientLeftColumn; i <= gradientRightColumn; i++) {
final Element element = primal.getElement(currentRow,i);
if (element != null) {
final Element elementBelow = primal.getElement(currentRow+1,i);
if ((element.getCameraCoordinateCount( ) ==1) &&
(elementBelow.getCameraCoordinateCount( ) == 1)) {
final ArrayList<CameraPoint> cameraPointList = new ArrayList<CameraPoint>( );
final CameraPoint cameraPoint = element.getCameraPoint(0);
final CameraPoint cameraPointBelow = elementBelow.getCameraPoint(0);
final CameraPoint clonedCameraPoint = new CameraPoint(cameraPoint);
final CameraPoint clonedCameraPointBelow = new CameraPoint(cameraPointBelow);
// Check if the two camera points are on the same column (there could be a row shift in between)
if (clonedCameraPoint.getCameraCoord( ).getColumn( ) !=
clonedCameraPointBelow.getCameraCoord( ).getColumn( )) {
// For now, force camera point left to same row
VPMPoint vpmPoint = new VPMPoint((short)clonedCameraPointBelow.getCameraCoord( ).getRow( ),
(short)clonedCameraPoint.getCameraCoord( ).getColumn( ));
clonedCameraPointBelow.setCameraCoord(vpmPoint);
}
// Check camera point is not on same row
if (clonedCameraPoint.getCameraCoord( ).getRow( ) == clonedCameraPointBelow.getCameraCoord( ).getRow( )) {
// For now, force camera point below to camera row above (camera points are bottom to top)
VPMPoint vpmPoint = new VPMPoint((short)(clonedCameraPoint.getCameraCoord( ).getRow( ) – 1),
(short)clonedCameraPointBelow.getCameraCoord( ).getColumn( ));
clonedCameraPointBelow.setCameraCoord(vpmPoint);
}
clonedCameraPoint.setBlackPoint(new BlackPoint((int)Math.round(gradientAmount),0,0));
clonedCameraPointBelow.setBlackPoint(new BlackPoint((int)Math.round(100.0 – gradientAmount),0,2));
cameraPointList.add(clonedCameraPoint);
cameraPointList.add(clonedCameraPointBelow);
addCameraPointsToMap(LineType.ROW,element.getProjectorPoint( ), cameraPointList);
}
else {
logger.error("setRowShiftPixelWeights descending coordinate counts are not == 1 shiftInfo=" + shiftInfo);
}
gradientAmount -= gradientStep;
}
}
```

The method traverses the VPM projector points from the left gradient column to the right gradient column in one embodiment. For each projector point element accessed the method also accesses the projector point element one line below the current projector point. The method then creates a clone of the upper and lower projector points' camera coordinates. These camera coordinates (one for each projector point in this example) are appended to a camera point list. The gradient and inverse gradient values are set in each camera point. In one embodiment, the black point red value indicated to the GPU processing code to set the gradient values. The end result is a gradual blending with values to the row below creating a gradient across the gradient start and end columns. The duplicated camera point list that forms the gradient is added to the appropriate row camera point map with the projector point as the key.

At this point row and column shifts have been processed by modifying the projector elements separately. Accordingly, two hash maps exist, i.e., row and column, with the projector point as the key. The value associated with the projector point key is a list of lists of camera points forming the gradient for either a row or column shift. In the final step a new VPM is created with the new camera pixels calculated for the projector points for the row or column shift gradients. One challenge in creating the VPM is that many of the row and column shift gradients intersect. If the camera points are just merged, the combination of points creates artifacts with some pixels having invalid values. Described below is a technique to merge the row and column gradients to update the VPM.

The method replaceNewCameraPoints( ) is called to update the VPM. The method first iterates through all the projector points in the row hash map. The row hash map contains a list of camera points lists associated with the projector point. The lists are first consolidated into a single list. The method then retrieves the list of camera points lists associated with the projector point in the column hash map. If a column list is not present, the camera points for the projector point are overwritten with the values from the row hash map. If a column list is present, the method combineCameraPointLists( ) is called to merge the row and column point lists. A new merged camera point list is returned from the method and this camera point list is then used to overwrite the camera points for the current projector point. In one embodiment, as each projector point entry in the column hash map is processed, it is removed from the column hash map. After all the entries in the row hash map are processed, any remaining entries in the column hash map are processed. In this case the camera point list from the hash map overwrites the corresponding camera points for the projector point. Finally, the method combineCameraPointLists( ) is described in how it merges the row and column camera point lists. The method is shown below:

```
private void combineCameraPointLists(final List<CameraPoint> combinedCameraPointList,final List<CameraPoint>
rowCameraPointList,final List<CameraPoint> columnCameraPointList,final VPMPoint projectorPoint) {
final CameraPoint commonCamera Point = findCommonCameraPoint(rowCameraPointList, columnCameraPointList);
if (commonCameraPoint != null) {
// row always above or below common camera point
final CameraPoint rowCameraPoint = findUncommonCameraPoint(commonCameraPoint,rowCameraPointList);
// column always left or right of common camera point
final CameraPoint columnCameraPoint = findUncommonCameraPoint(commonCameraPoint,columnCameraPointList);
final int commonRow = commonCameraPoint.getCameraCoord( ).getRow( );
final int commonColumn = commonCameraPoint.getCameraCoord( ).getColumn( );
// Determine if row camera point is above or below common point
final Direction rowDirection = rowCameraPoint.getCameraCoord( ).getRow( ) < commonRow ? Direction.TOP :
Direction.BOTTOM;
// Determine if column camera point left or right of common point
final Direction columnDirection = columnCameraPoint.getCameraCoord( ).getColumn( ) < commonColumn ?
Direction.LEFT : Direction.RIGHT;
// Using row camera point but could have used column as the other values should be close either way
final CameraPoint diagonalCameraPoint = new CameraPoint(rowCameraPoint);
final int rowPercentage = rowCameraPoint.getBlackPoint( ).getRed( );
final int columnPercentage = columnCameraPoint.getBlackPoint( ).getRed( );
int commonPercentage = -1;
int diagonalPercentage = -1;
CameraPoint additionalCameraPoint = null;
int additionalPercentage = -1;
if (rowPercentage == columnPercentage) {
commonPercentage = 100 - rowPercentage;
diagonalPercentage = rowPercentage;
additionalCameraPoint = null;
}
else if (rowPercentage < columnPercentage) {
// common camera point percentage is stronger for row. We want to set common camera
// point to the same value as the common column percentage.
commonPercentage = 100 - columnPercentage;
diagonalPercentage = rowPercentage;
additionalPercentage = 100 - commonPercentage - diagonalPercentage;
additionalCameraPoint = new CameraPoint(columnCameraPoint);
}
else {
// common camera point percentage is stronger for column. We want to set common camera
// point to the same value as the common row percentage.
commonPercentage = 100 - rowPercentage;
diagonalPercentage = columnPercentage;
additionalPercentage = 100 - commonPercentage - diagonalPercentage;
additionalCameraPoint = new CameraPoint(rowCameraPoint);
}
if (additionalCameraPoint != null) {
final BlackPoint additionalBlackpoint = new BlackPoint(additionalPercentage,0,0);
additionalCameraPoint.setBlackPoint(additionalBlackpoint);
}
```

```
final BlackPoint diagonalBlackpoint = new BlackPoint(diagonalPercentage,0,0);
diagonalCameraPoint.setBlackPoint(diagonalBlackpoint);
final BlackPoint commonBlackpoint = new BlackPoint(commonPercentage,0,1);
commonCameraPoint.setBlackPoint(commonBlackpoint);
int diagonalRow = -1;
int diagonalColumn = -1;
if (rowDirection == Direction.TOP) {
if (columnDirection == Direction.LEFT) {
// TOP and LEFT
diagonalRow = commonRow - 1;
diagonalColumn = commonColumn - 1;
}
else {
// TOP and RIGHT
diagonalRow = commonRow - 1;
diagonalColumn = commonColumn + 1;
}
}
else {
if (columnDirection == Direction.LEFT) {
// BOTTOM and LEFT
diagonalRow = commonRow + 1;
diagonalColumn = commonColumn - 1;
}
else {
// BOTTOM and RIGHT
diagonalRow = commonRow + 1;
diagonalColumn = commonColumn + 1;
}
}
final VPMPoint diagonalPoint = new VPMPoint((short)diagonalRow,(short)diagonalColumn);
diagonalCameraPoint.setCameraCoord(diagonalPoint);
combinedCameraPointList.add(commonCameraPoint);
combinedCameraPointList.add(diagonalCamera Point);
if (additionalCameraPoint != null) {
combinedCameraPointList.add(additionalCamera Point);
}
}
else {
final String message = "combineCameraPointLists could not find common camera point";
logger.error(message);
throw new IllegalStateException(message);
}
}
```

The method first searches the two row and column camera point lists to find the common camera point. In this example there are two camera points in each list for the given projector point. The layout in camera points is illustrated and explained in more detail below with reference to FIG. 6.

Figure 6:
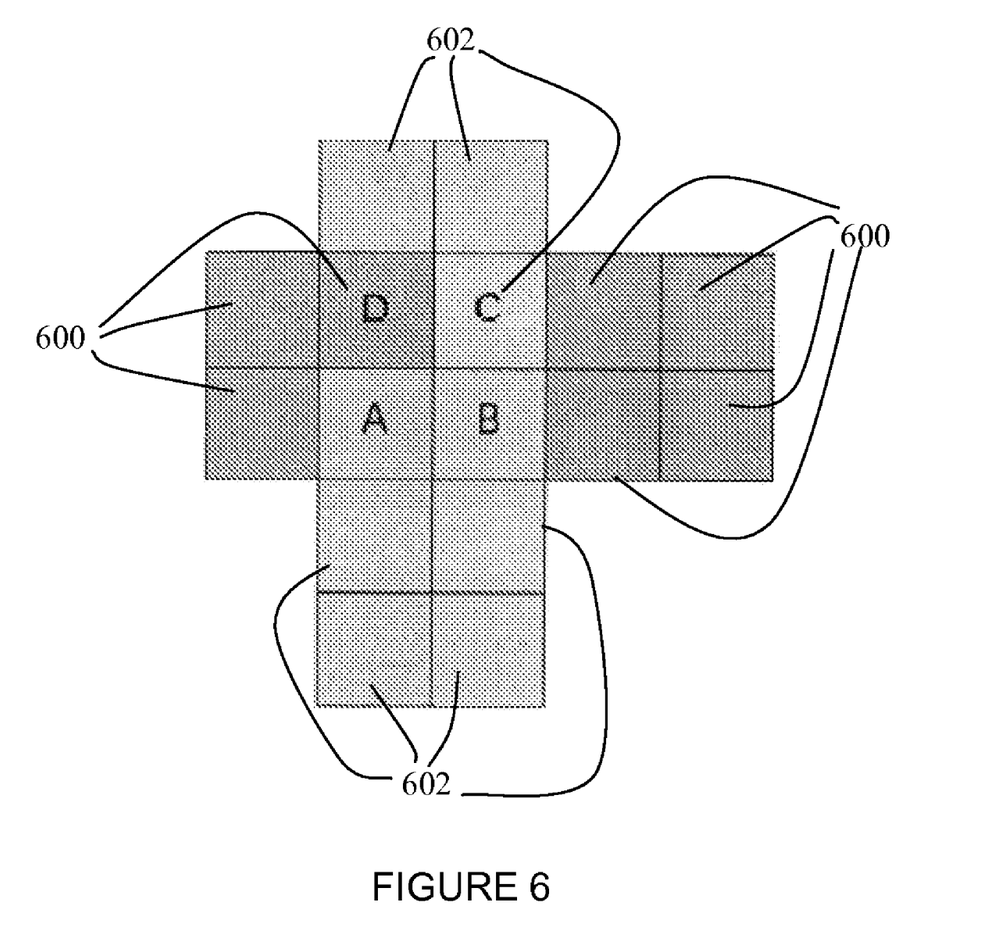
FIG. 6 is a simplified schematic diagram illustrating an arrangement of camera pixels where row and column gradients intersect in accordance with one embodiment of the invention.

FIG. 6 illustrates the arrangement of camera pixels where row and column gradients intersect. Squares 600 show the row gradient and squares 602 show the column gradient. In this example the projector pixel that maps to the row gradient camera pixels BC and the column gradient pixels AB is being processed. The common camera point in this example is B. The method next finds the row camera point C and the column camera point A. Once all the points are identified the system next examines the gradient intensity values stored in the red channel of the black point object of each camera point.

A diagonal camera point object is allocated using the same properties as point C. Next the gradient intensity values of camera point A and C are compared. If the gradient intensity values are equal, the common point's gradient intensity value is set to 100 minus the gradient intensity value of camera point A. The diagonal camera point gradient intensity value is set to the gradient intensity value of camera point A. If gradient intensity values of camera points A and C are not equal, an additional camera point is allocated. This example proceeds through the steps when the gradient intensity value of the row camera point C is less than the column camera point A in one embodiment. It should be appreciated that a similar process is followed when the reverse is true.

Still referring to FIG. 6, if the case where the row camera point C gradient intensity value is less than camera point A intensity value, the common camera point B has a stronger gradient intensity value in the row list. The common camera point gradient intensity value is set to 100−the gradient intensity value of camera point A. The diagonal camera point gradient intensity value is set to the value of row camera point C. An additional camera point is allocated using the properties of the column camera point A. The gradient intensity value of this additional camera point is set to 100−common camera point gradient intensity value—the diagonal camera point gradient intensity value.

Finally, the location of the diagonal camera point is calculated. In the example of FIG. 6 this is camera point D. A list is allocated and the diagonal camera point, the common camera point, and the additional camera point (if needed) are added to the list. This list is then used to overwrite the existing camera points for the current projector point in the VPM. After the remaining column entries in the column hash map that do not have matching entries in the row hash map are processed, the VPM updating process has been completed.

Figure 7A:
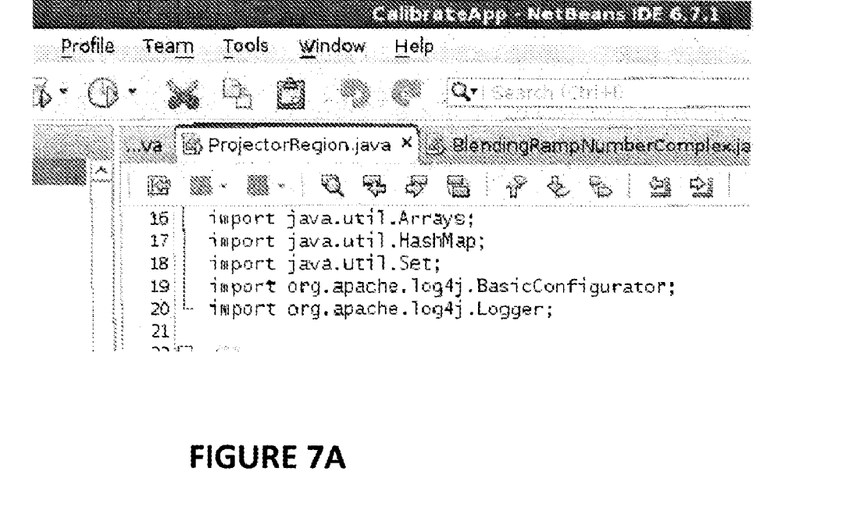
FIGS. 7A and 7B are simplified schematic diagrams illustrating a display from the multi-projector system utilizing the view projection matrix with and without the artifact correction algorithm, respectively, in accordance with one embodiment of the invention.
Figure 7B:
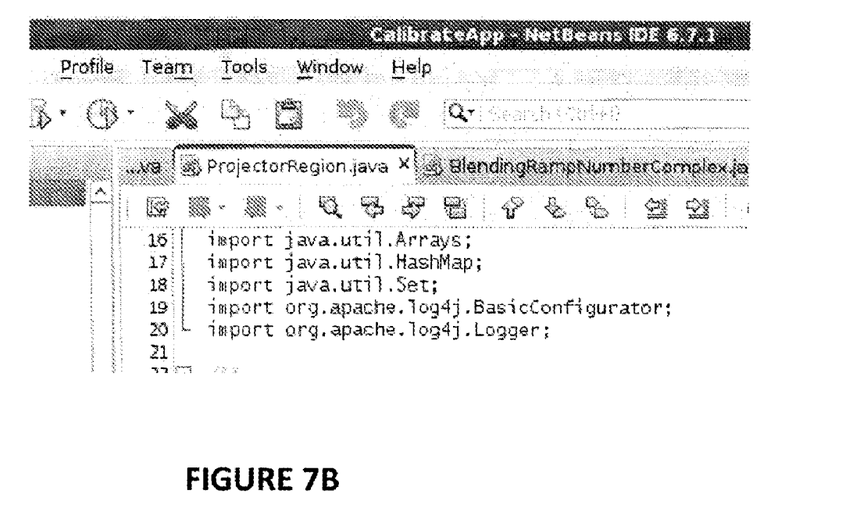

FIGS. 7A and 7B illustrate a desktop view with and without the VPM row and column shifts modified by the processing method described above, respectively, in accordance with one embodiment of the invention. Jagged lines can be seen in the vertical scroll bar on the left side of FIG. 7A, among other locations. The jagged lines and font distortion of FIG. 7A is removed through the processing described above and as illustrated by FIG. 7B.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. In this regard, it will be appreciated that there are many other possible orderings of the operations in the processes described above and many possible modularizations of those orderings in the system. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

The invention claimed is:

1. A method for correcting a projection from a plurality of digital projectors, comprising:
   receiving as an input a matrix which maps each pixel to be projected to a captured pixel that includes a row value and a column value;
   detecting a shift with respect to one of row or column values in the matrix;
   determining attributes of the shift, wherein the attributes include a type for the shift and an overlap length for the shift;
   determining a gradient length from the overlap length;
   generating a gradient of pixel weightings for each gradient length, wherein the pixel weightings are uniformly sloping and are associated with pixels in the gradient length and neighboring pixels;
   merging intersecting gradients; and
   creating a list that includes common points and diagonal points from the merging.

2. A method as in claim 1, further comprising:
   updating captured pixel values in the matrix with new values determined by the list, and wherein each of the captured pixels is captured by a digital camera from a projection of calibration images.

3. A method as in claim 1, further comprising:
   projecting a unified image from the plurality of digital projectors while utilizing the matrix.

4. A method as in claim 3, wherein the unified image is of a graphical user interface for one of an operating system or an application program.

5. A method as in claim 1, wherein the attributes further include a location for the shift and a direction for the shift.

6. A method as in claim 1, further comprising:
   creating the input matrix through homography.

7. A method as in claim 6, wherein each of the row values in a row of the matrix is expected to be equal.

8. A method as in claim 6, wherein each of the column values in a column of the matrix is expected to be equal.

9. A method for correcting a projection from a plurality of digital projectors, comprising:
   receiving as an input a matrix which maps each pixel to be projected to a captured pixel that includes a row value and a column value;
   detecting a shift with respect to one of row or column values in the matrix, wherein the shift is measured by an overlap length;
   determining a gradient length from the overlap length;
   generating a gradient of pixel weightings for each gradient length;
   merging any gradients that intersect, wherein the merging results in the creation of a list of that includes common points and diagonal points; and
   updating the captured values in the matrix with new values determined by the list.

10. The method of claim 9, further comprising:
    determining attributes of the shift.

11. The method of claim 10, wherein the attributes include a location for the shift, a direction for the shift, a type for the shift, and an overlap length for the shift.

12. The method of claim 9, wherein the pixel weightings are uniformly sloping and are associated with pixels in the gradient length and their neighboring pixels.

13. A method as in claim 9, wherein each of the captured pixels was captured by a digital camera from a projection of calibration images.

14. A method as in claim 9, further comprising:
    projecting a unified image from the plurality of digital projectors while utilizing the matrix.

15. A method as in claim 14, wherein the unified image is of a graphical user interface for one of an operating system or an application program.

16. A non-transitory computer-readable storage medium with an executable program stored thereon, wherein the program instructs a microprocessor to perform the following steps:
    receiving as an input a matrix which maps each pixel to be projected to a captured pixel that includes a row value and a column value;
    detecting a shift with respect to row or column values in the matrix, wherein the shift is measured by an overlap length;
    determining a gradient length from the overlap length;
    generating a gradient of pixel weightings for each gradient length;
    merging any gradients that intersect, wherein the merge results in the creation of a list of that includes common points and diagonal points; and
    updating the captured values in the matrix with new values determined by the list.

17. A non-transitory computer-readable storage medium as in claim 16, wherein each of the captured pixels was captured by a digital camera from a projection of calibration images.

* * * * *